United States Patent [19]

Paas

[11] Patent Number: 5,431,706
[45] Date of Patent: Jul. 11, 1995

[54] DISPOSABLE PARTICULATE FILTER

[75] Inventor: Norbert Paas, Louisville, Colo.

[73] Assignee: Dry Systems Technologies, Louisville, Colo.

[21] Appl. No.: 131,727

[22] Filed: Oct. 5, 1993

[51] Int. Cl.⁶ .................. B01D 29/52; B01D 29/54
[52] U.S. Cl. ........................... 55/342; 55/344; 55/350.1; 55/385.3; 55/484; 55/502; 55/510; 55/528; 55/DIG. 30
[58] Field of Search ............... 55/342, 343, 379, 42 D, 55/484, 502, 508, 518, 528, DIG. 30, 510, 350.1, 344, 385.3, 527

[56] References Cited

U.S. PATENT DOCUMENTS

| | | | |
|---|---|---|---|
| 2,116,085 | 5/1938 | Benkel | 55/343 X |
| 3,100,146 | 8/1963 | Huntington | 55/DIG. 30 X |
| 3,290,870 | 12/1966 | Jensen | 55/486 |
| 3,731,678 | 5/1973 | Pyzel | 55/420 X |
| 4,233,042 | 11/1980 | Tao | 55/482 |
| 4,318,720 | 3/1982 | Hoggatt | 55/276 |
| 4,350,509 | 9/1982 | Alseth et al. | 55/337 |
| 4,576,799 | 3/1986 | Worner et al. | 55/484 X |
| 4,853,007 | 8/1989 | Leonhard et al. | 55/DIG. 30 X |
| 4,948,398 | 8/1990 | Thomaides et al. | 55/320 X |
| 5,238,472 | 8/1993 | Pfister et al. | 55/DIG. 30 X |
| 5,272,874 | 12/1993 | Paas | 60/297 |

Primary Examiner—Richard L. Chiesa
Attorney, Agent, or Firm—Bruce E. Dahl

[57] ABSTRACT

A gas permeable filter element formed solely from filter material defines a substantially cylindrical inner filter element and a substantially cylindrical outer filter element joined together by an end filter element. The outer filter element is radially spaced and concentric with said inner filter element, so that the inner and outer filter elements define an annulus having an inlet end. A particulate laden gas stream directed into the open end of the annulus defined by the inner and outer filter elements passes through either the inner filter element, the outer filter element, or the end filter element.

9 Claims, 4 Drawing Sheets

DISPOSABLE PARTICULATE FILTER

BACKGROUND OF THE INVENTION

1. Field of the Invention

This invention relates generally to filters for removing particulates from particulate laden gas streams and more specifically to a low-cost disposable particulate filter for removing particulates from the exhaust of internal combustion engines.

2. Background of the Invention

Particulate filters have long been used in a wide range of applications where it is necessary to remove particulate matter from gas or liquid streams with high collection efficiencies. Particulate filters are also being used with increasing frequency to remove soot and other particulate matter from the exhaust of internal combustion engines, particularly diesel engines.

As is well known, the exhaust from diesel engines contains numerous components thought to be harmful to humans, such as unburned hydrocarbons, carbon monoxide (CO), oxides of nitrogen ($NO_x$), sulfur dioxide ($SO_2$), sulfates, and various aerosols. The solid particulate matter in diesel engine exhaust typically comprises small, solid, irregularly shaped particles, which are themselves agglomerates of smaller sub-particles. The particles may often have high molecular weight hydrocarbons absorbed on their surfaces, thus making the particulate matter a complex mixture of pure carbon and various kinds of organic materials, the sizes of which may range from very small particles of about 0.01 microns to relatively large clusters in the range of 10–30 microns. Turbocharged diesel engines tend to emit more of the smaller particles, but with much lower levels of retained organic compounds. Particle sizes of 10 microns and less are considered to be the most damaging to human lungs, and certain characteristic components of diesel exhaust particulate emissions are known carcinogens.

Many different types of exhaust treatment systems have been developed in an attempt to remove or eliminate the particulate matter before it is released into the atmosphere. Such systems almost always use some type of filter to trap the particles in the exhaust stream. Ceramic materials, stainless steel wire mesh, and other filter materials capable of withstanding the high-temperature exhaust gases have been tried and are being used with some degree of success. Unfortunately, because of the large quantities of particulate matter that are generated by most diesel engines, most filters tend to clog quickly, which increases back pressure in the engine exhaust and adversely affects the performance and efficiency of the engine. Of course, one remedy is to replace the filter when the back pressure exceeds some predetermined limit. However, the metal or ceramic filter materials used in most exhaust filters are expensive, so it is not practical to throw away the filters when they become clogged. As a result, several filter regeneration methods have been developed in attempts to solve the clogging problem. Unfortunately, the space, cost, and energy consumption required by such regeneration methods are substantial. Furthermore, in-situ filter regeneration techniques, where the filters rely on the hot exhaust gases themselves to raise the temperature of the filter high enough to oxidize the trapped particles, cannot be used with engines that operate under light duty cycles.

Another type of exhaust treatment system, described in my co-pending patent application, Ser. No. 07/765,689, filed on Sep. 26, 1991, now U.S. Pat. No. 5,272,874, represents a significant breakthrough in exhaust filtration technology. That system uses an exhaust-to-water heat exchanger to lower the temperature of the exhaust gases, thereby allowing the use of inexpensive, low-temperature filter materials to trap exhaust-borne particulates.

While the low-temperature particulate filter described in that patent is effective in removing the particulate matter with a high collection efficiency, it is not without its drawbacks. For example, while the low-temperature filter is substantially less expensive then filters made from materials that can withstand higher temperatures, such as ceramic materials, the filter requires metal end plates and metal screens on both sides of the filter media to provide the required structural integrity and support for the filter element. Besides increasing the cost of the filter, such metal components complicate filter disposal. That is, since the filter media traps primarily carbon particles and other unburned hydrocarbons, old filters are well suited for incineration. However, the presence of the metal components complicates the incineration process. The metal components are also a concern if the old filters are disposed of in landfills.

Another disadvantage associated with the filter described in U.S. Pat. No. 5,272,874 is that it is a conventional cylindrical design, which limits the surface area of the filter. Obviously, it is desirable to maximize the surface area of the filter to reduce the exhaust back pressure and to increase filter life. Of course, one way to increase the surface area of such a cylindrical filter would be to increase either the diameter or length of the filter, or both. Another way to increase the filter area would be to install another filter element in parallel with the existing element. Unfortunately, however, neither of the foregoing options are particularly desirable, since the space that can be devoted to the filter assembly is limited in most installations. In fact, the space constraints in most vehicles require that the filter be as small as possible.

Another problem associated with conventional cylindrical filter designs used in such applications is that the filters do not adequately contain the fine, powdery soot accumulated therein, and a substantial amount of the loosely captured soot usually falls out of the filter after it is removed from the filter housing. Besides making a mess, the escaping soot can pose health problems because of the extremely small sizes of the particles released.

Consequently, there remains a need for an improved disposable particulate filter that can be used in conjunction with exhaust treatment systems for internal combustion engines. Such a filter should provide a large surface area to minimize the pressure drop across the filter element and maximize filter life, but without substantially increasing the size of the filter. The filter should also be inexpensive to manufacture, yet maintain high collection efficiency, all while requiring few or no integral metal components.

SUMMARY OF THE INVENTION

Accordingly, it is a general object of this invention to provide a disposable particulate filter for removing solid particulate matter from the exhaust of internal combustion engines.

It is another object of this invention to provide a disposable particulate filter having increased filter area.

It is a further object of this invention to provide a filter having increased surface area, but without substantially increasing the external dimensions of the filter.

It is yet another object to provide a disposable particulate filter that contains upon removal substantially all of the filtered particles.

It is still a further object to provide a disposable particulate filter that does not require integral metal support components.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the disposable particulate filter according to this invention may comprise a gas permeable filter that includes a substantially cylindrical inner filter element and a substantially cylindrical outer filter element that are joined together at one end by an end filter element. The outer filter element is radially spaced and concentric with said inner filter element, so that the inner and outer filter elements define an annulus. A particulate laden gas stream directed into the inlet end of the annulus passes through either the inner filter element, the outer filter element, or the end filter element.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
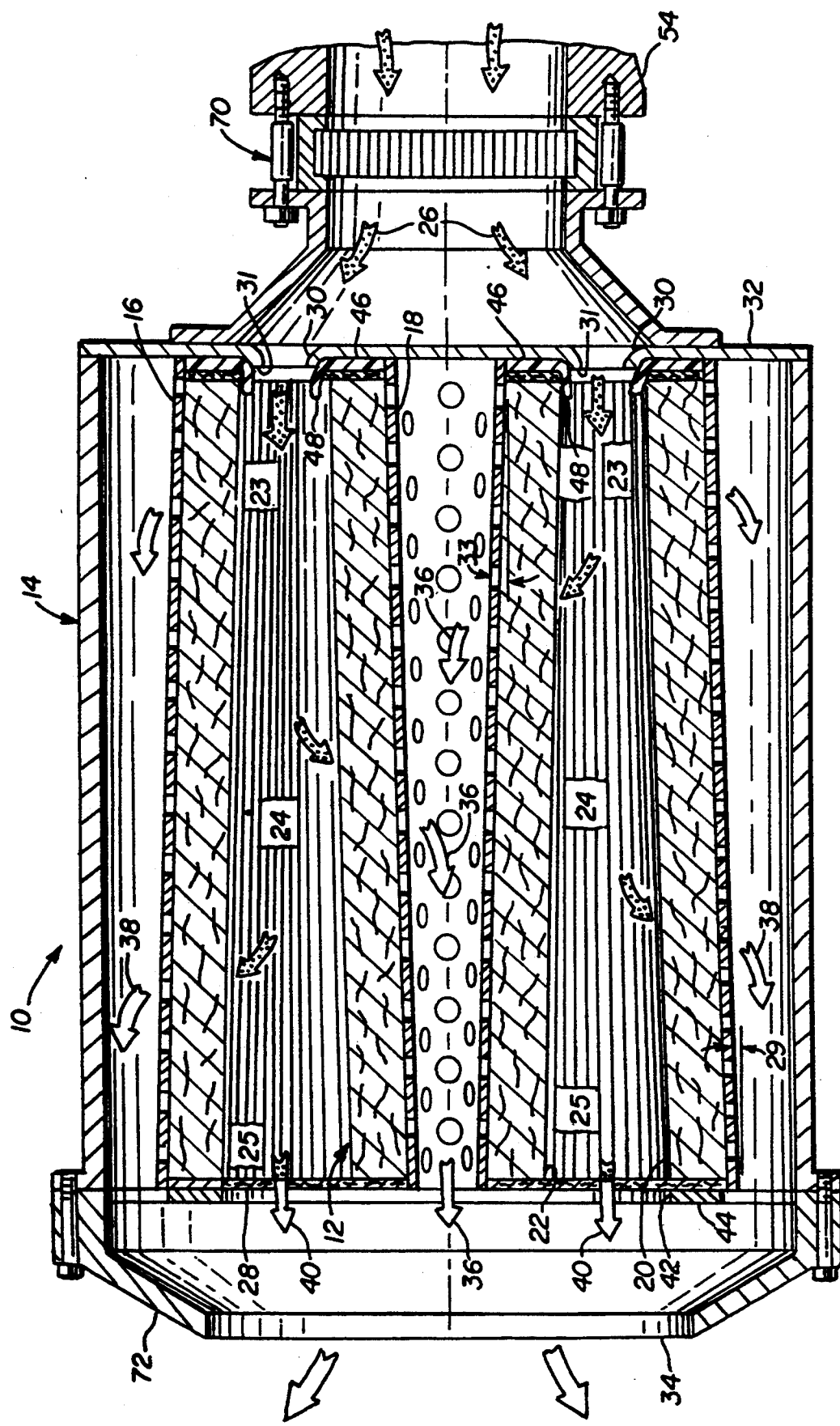
FIG. 1 is a sectional view in elevation of the preferred embodiment of the disposable annular particulate filter showing the position of the one-piece disposable, low-temperature filter and the flow of a particulate laden gas stream through the inner filter element, the outer filter element, and the end filter element.

The preferred embodiment 10 of the disposable annular particulate filter according to the present invention is best seen in FIG. 1 and comprises an annular filter 12 positioned within a housing assembly 14 and supported by a gas permeable outer filter support 16 and a gas permeable inner filter support 18. The filter 12 comprises an outer filter element 20 and an inner filter element 22 positioned in spaced-apart concentric relation, thus forming an annulus 24 having a outlet end 25 and an inlet end 23. Outlet end 25 is covered with an end filter element 28, while inlet end 23 of annulus 24 is open to the incoming particle laden gas stream 26 via annular slots 30 in inlet plate 32. Inlet end 23 also includes a gas impervious resilient end seal 46 to contain the filtered particulate matter within the annulus 24 after the filter 12 is removed from the housing 24. Specifically, end seal 46 includes a plurality of self-sealing end flaps 48 (FIG. 4) that are opened by turned-out edges 31 of inlet slots 30 when the filter 12 is seated against inlet plate 32. When the filter is removed, the flaps 48 of end seal 46 spring back together, closing off annulus 24, thus retaining the filtered particulate matter within the filter.

Incoming particle laden air 26 enters annulus 24 through the plurality of slots 30 in inlet plate 32 and open flaps 48 in end seal 46, as best seen in FIG. 1. Once inside the annulus 24, the particle laden air 26 may take one of three paths to the outlet 34 in end cap assembly 72. The first path, indicated by arrows 36, is through the inner filter element 22, through gas permeable inner filter support 18 and out through the outlet 34 in end cap assembly 72. The second path, indicated by arrows 38, is through the outer filter element 20 and gas permeable outer filter support 16, while the third path, indicated by arrows 40, is through the end filter element 28 and central aperture 42 in filter retaining ring 44.

A significant advantage of the disposable annular particulate filter 10 according to the present invention is that the annular configuration of the outer and inner filter elements 20, 22 substantially increases the filtration area over that which could be achieved with a conventional cylindrical filter design. The filter area is further increased by end filter element 28, which provides an additional path for the particle laden gas stream 26. Another advantage of the present invention is that the entire filter 12 can be made from the filter media material itself, without the need for integral metal support elements, such as end retainers or filter media support screens. Besides saving production costs, the absence of metal end caps and media support screens allows the filter 12 to be incinerated or disposed of in landfills without any special difficulties. Finally, the self-sealing flaps 48 in resilient end seal 46 retain the filtered particulate matter within the filter 12 when it is removed from the housing assembly 14.

Before proceeding with a detailed description of the disposable annular particulate filter 10, it should be noted that the filter according to the present invention is not limited to the use shown and described herein, and could be used in any application where it is desirable to remove particulate matter from a gas stream, whether it be the exhaust from a diesel engine, or some other particulate laden gas. Consequently, the disposable particulate filter 10 should not be regarded as limited to the particular application shown and described herein.

Figure 2:
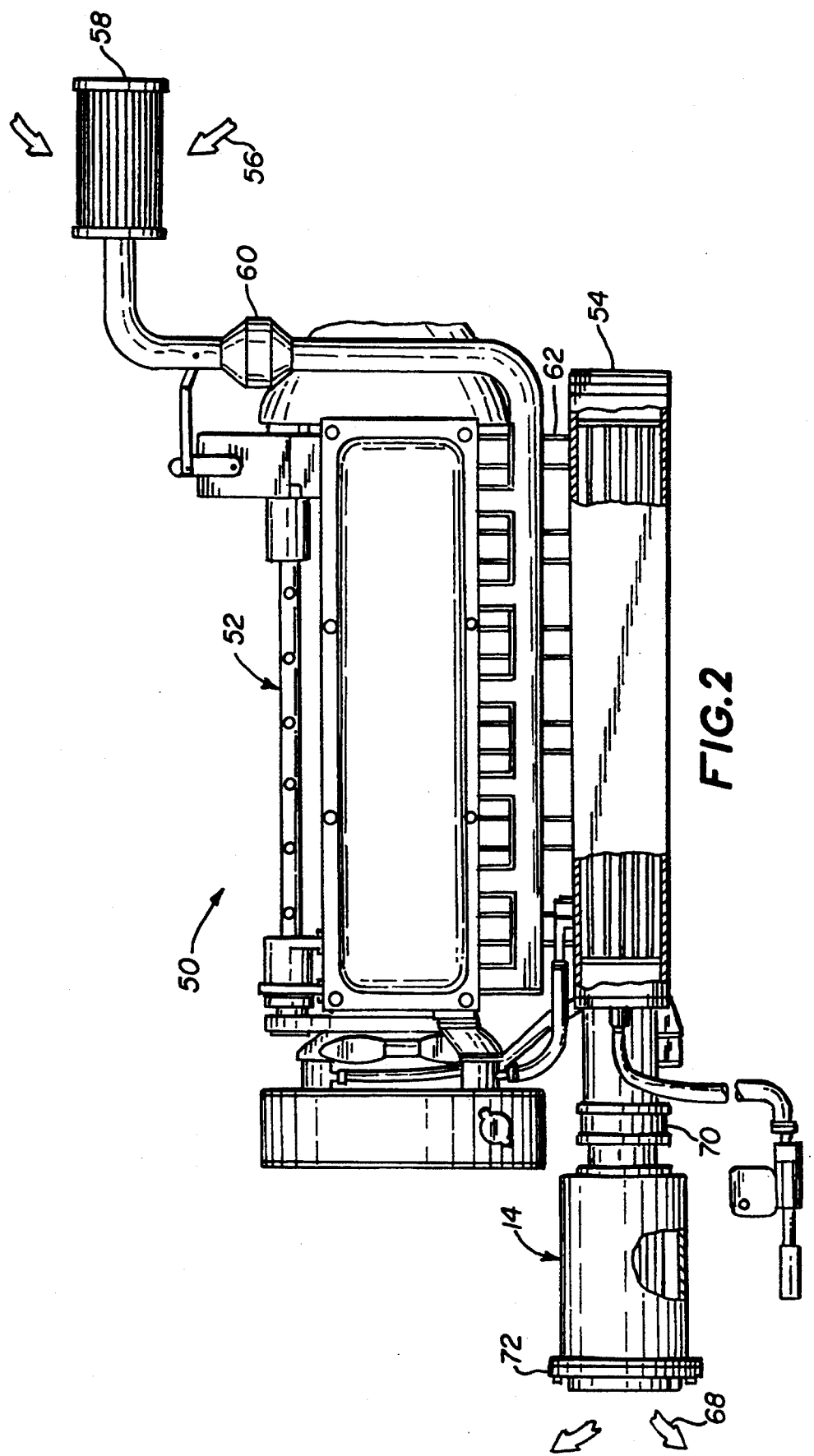
FIG. 2 is a plan view of the disposable annular particulate filter according to the present invention as it could be used in conjunction with my improved exhaust treatment system.

The preferred embodiment 10 of the disposable particulate filter according to the present invention is shown in FIGS. 1 and 2 as it could be used on the improved exhaust treatment system 50 described in U.S. Pat. No. 5,272,874. However, since the exhaust treatment system 50 is designed for use on a "mine certified" diesel engine 52, it includes numerous elements that are not required for, nor a part of, the present invention. For example, a key element in the exhaust treatment system 50 is the self-cleaning exhaust gas heat exchanger 54. While not necessary to achieve the objects of the present invention, the exhaust gas heat exchanger 54, or some other type of heat exchanger, is required if the present invention is to be used to filter hot exhaust gases, which, if not cooled, could ignite the filter media. The exhaust treatment system 50 also contains other components that are not necessary for, nor a part of, the present invention. However, persons having ordinary skill in the art will recognize those additional components that are not a part of the present invention and realize that they are only shown and described herein for the purpose of providing complete description of one use of the disposable filter.

During engine operation, intake air 56 is drawn into the engine 52 through an intake air filter 58 and a spark arrester assembly 60. The intake air 56 is compressed, mixed with fuel, and the fuel-air mixture burned in the engine combustion chambers (not shown) in a conventional manner. Immediately after leaving the combustion chamber, the raw exhaust gases pass through the exhaust manifold 62 and into the heat exchanger 54. Heat exchanger 54 cools down the hot exhaust gases from temperatures in the range of about 1200° F. to temperatures in the range of about 300° F. or below. The cooled exhaust gases then exit the heat exchanger 54 and enter the particulate filter assembly 10 (FIG. 1), which removes substantially all of the solid particulate soot matter from the exhaust gases. The cooled, filtered exhaust gases 68 are then discharged into the atmosphere.

Referring now to FIG. 1, the preferred embodiment 10 of the disposable annular particulate filter includes a cylindrical housing assembly 14 adapted for attachment at one end to spark arrestor assembly 70 on heat exchanger 54. An end cap assembly 72 bolted to the opposite end of the cylindrical housing assembly 14 includes a filter retaining ring 44 that holds the filter 12 firmly against the inlet plate 32. When the filter element 12 becomes clogged, end cap assembly 72 is removed, the clogged filter element 12 removed and discarded, and a new filter element inserted into the housing 14.

The filter element 12 includes an outer filter element 20 and an inner filter element 22 mounted in spaced apart concentric relation, so that an annulus 24 is created between the inner filter element 22 and the outer filter element 20. As was described above, the inner and outer filter elements 22 and 20 are held together at the gas permeable closed end 25 by an end filter element 28 and at the inlet end 23 by end seal 46. The end filter element 28 provides additional filtration area and is preferably made from the same material as the inner and outer filter elements 22 and 20.

As best seen in FIG. 1, the inner and outer filter elements 22 and 20 are pleated in the conventional manner and the end filter element 28 may either be plain or pleated. Depending on the particular application, the filter may be made from cellulose fiber, polymeric compounds, glass fibers, ceramic fibers, or any mixture thereof. In the preferred embodiment, the filter material comprises a pleated mat of randomly distributed cellulose fibers saturated with a thermoplastic binder. The material has a basis weight of about 76 pounds per 3,000 square feet, an overall thickness of about 0.028 inches, and a frazier air flow of about 26 cubic feet per minute. Filter material having the foregoing characteristics and specifications is available from Fleetguard, Inc., of Nashville, Tenn. End seal 46 may be made from the filter material itself, depending on the characteristics and resiliency of the particular material selected, or may be made from synthetic rubber, polyurethane, or any other resilient, rubber-like material capable of withstanding the temperature and/or chemical composition of the particulate laden gas stream likely to be encountered by the filter 12.

Since filter 12 of the preferred embodiment is made entirely from pleated cellulose filter material, it does not have a great deal of dimensional stability and, therefore, needs to be supported within housing assembly 14 by the outer and inner filter supports 16 and 18. In the preferred embodiment, outer filter support 16 comprises a frustro-conical perforated tube with the smaller diameter end being secured to inlet plate 32. The inner filter support 18 is also a frustro-conical perforated tube, but with the larger diameter end being secured to inlet plate 32, so that it is concentric with outer filter support 16. The opposing orientations of the frustro-conical filter supports, in combination with the filter retaining ring, securely retains the filter element 12 within housing 14. The particular taper angles 29 and 33 of the respective frustro-conical outer and inner filter supports 16 and 18 are not critical to the invention and a wide range of taper angles may be used to provide sufficient bias to securely retain the filter elements 20 and 22 within housing 14. In the preferred embodiment, the taper angles 29 and 33 of the respective outer and inner filter supports is in the range of about 3 degrees.

Figure 3:
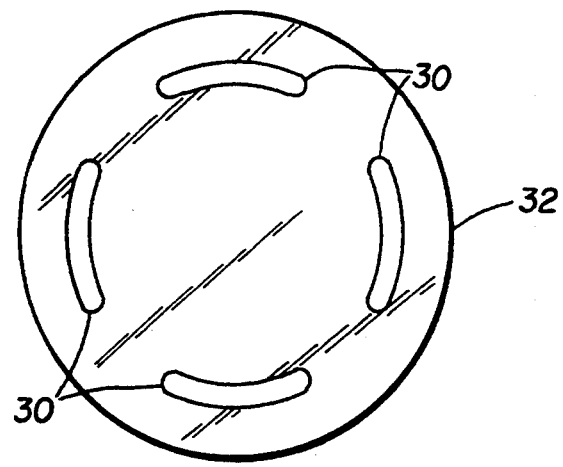
FIG. 3 is a plan view of the inlet plate showing the position and arrangement of the annular inlet slots.
Figure 4:
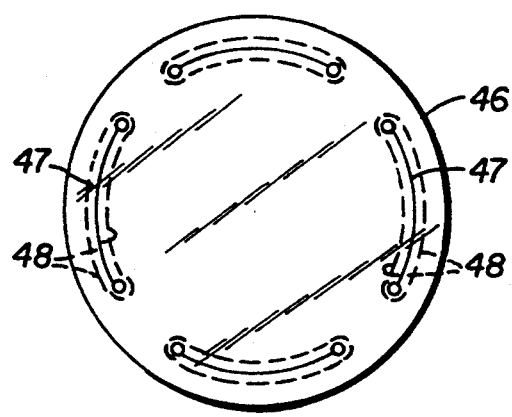
FIG. 4 is a plan view of the resilient end seal showing the arrangement of the self-sealing flaps.

Referring now to FIGS. 1, 3, and. 4, simultaneously, the inlet plate 32 includes a plurality of slots 30 that are arranged radially around the plate, so that they communicate with the annulus 24 defined by the inner and outer filter elements 22 and 20. The edge 31 of each slot 30 is turned out and is adapted to open the flaps 48 in end seal 46 when the filter element 12 is seated against inlet plate 32, as best seen in FIGS. 1 and 4. Consequently, when the end cap assembly 72 is removed and filter 12 withdrawn, the flaps 48 will return to their original position to seal annulus 24 and trap the filtered particulates within the annulus.

Figure 5:
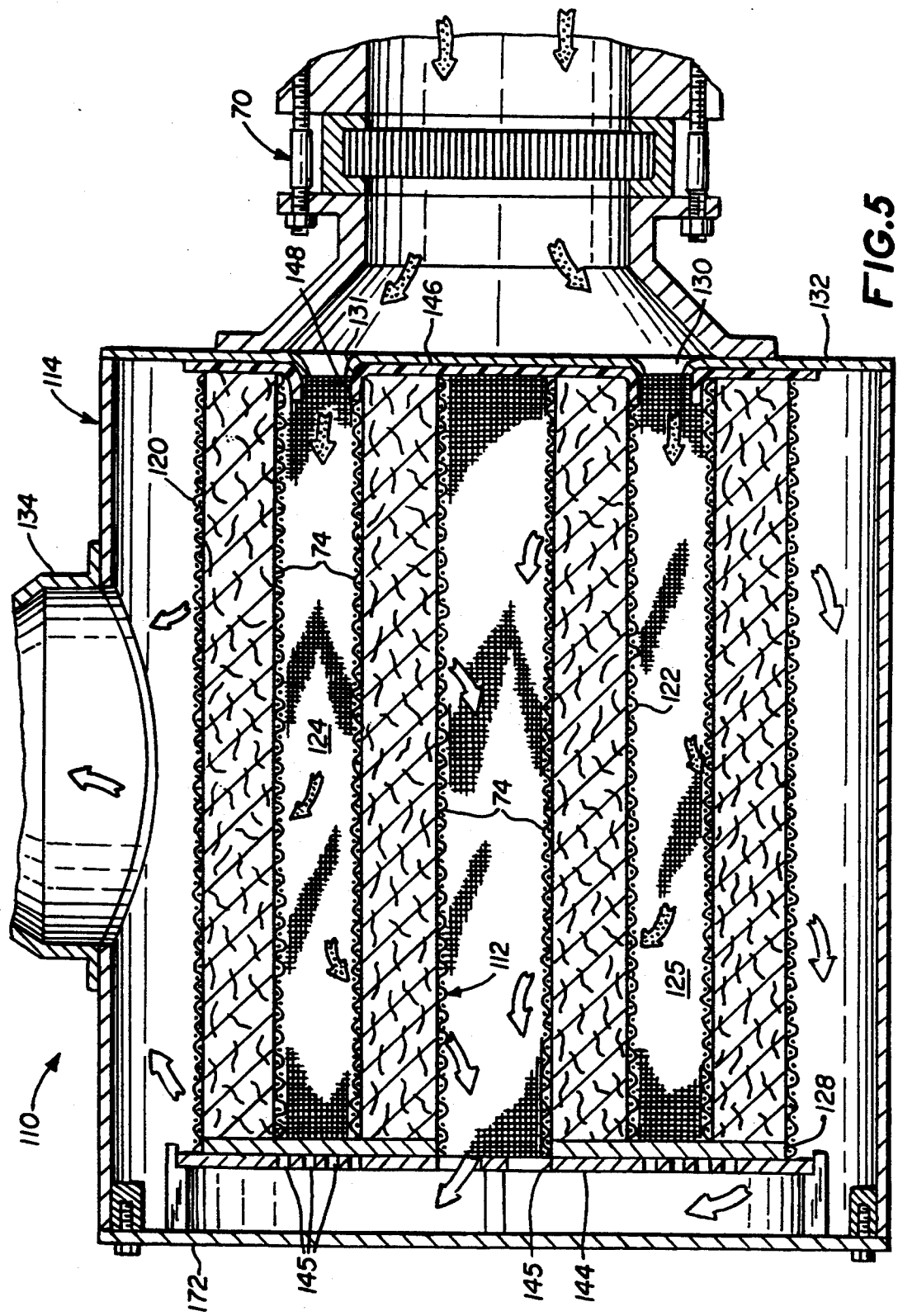
FIG. 5 is a sectional view in elevation of a second embodiment of the disposable annular particulate filter.

A second embodiment 110 of the disposable annular particulate filter is shown in FIG. 5, and differs from the preferred embodiment 10 in that the filter 112 includes integral filter support screens 74. The housing assembly 114 of the second embodiment 110 also differs from the preferred embodiment in that it has radial outlet 134, as opposed to the axial outlet 34 of the preferred embodiment. However, housing assembly 114 still includes a removable end cap assembly 172 and filter retaining plate 145 to allow the filter element 112 to be changed as required.

The integral filter support screens 74 of filter 112 surround both the inside and outside surfaces of the outer filter element 120 and the inner filter element 122. Filter 112 may optionally include metal end retaining plates (not shown) for added rigidity. Consequently, the second embodiment 110 does not require the frustro-conical inner and outer filter supports 18, 16 of the first embodiment. However, this second embodiment 110 does include a resilient end seal 146 having a plurality of flaps 148 for engaging the turned out edges 131 of slots 130 in inlet plate 132. Moreover, the gas permeable outlet end 125 of annulus 124 is also covered with an end filter element 128 to provide a third filtration path, just like the preferred embodiment. Finally, housing assembly 114 also includes a perforated filter retaining plate 144 having a plurality of perforations 145 to allow the filtered gas stream from the inner filter element 122 and end filter element 128 to pass through outlet assembly 134.

This completes the detailed description of the preferred embodiments 10 and 110 of the disposable annular particulate filter according to the present invention. While a number of specific components were described above for the preferred embodiments of this invention, persons having ordinary skill in the art will recognize that other substitute components or combinations of components may be available now or in the future to accomplish comparable functions. For example, many types of filter materials exist which could be substituted for the particular filter material shown and described herein. That is, the selection of the filter material is primarily driven by the particular environment in which the annular filter is to be used, as well as on the type of particulate matter to be filtered. Likewise, the disposable annular particulate filter is not limited to use with the a diesel engine exhaust treatment system and can be used in any application requiring the removal of particles from a particulate laden gas stream, so long as the filter media material and end seal material are selected to withstand the anticipated environment. Actually, the filter is not limited to use in gas streams and could be readily modified to remove particles from a liquid stream, as would be obvious to persons having ordinary skill in the art.

Consequently, the foregoing is considered illustrative only of the principles of the invention. Further, since numerous other modifications and changes will readily occur to those skilled in the art, it is not desired to limit the invention to the exact construction and operation shown and described herein. Accordingly, all suitable modifications and equivalents may be considered as falling within the scope of the invention as defined by the claims which follow.

The embodiments of the invention in which an exclusive property or privilege is claimed are defined as follows:

1. A gas permeable filter element comprising a substantially cylindrical inner filter section joined to a substantially cylindrical outer filter section by an end filter section, said outer filter section being radially spaced and concentric with said inner filter section so that the inner and outer filter sections define an annulus having an inlet end and an outlet end coextensive with respective inner and outer filter section inlet and outlet ends, said end filter section attached in contact with and closing the inner and Outer filter section outlet ends and extending coextensively across and closing said annulus outlet end, whereby a particulate laden gas stream directed into the inlet end of the annulus will pass through either the inner filter section, the outer filter section, or the end filter section.

2. The gas permeable filter element of claim 1, wherein said filter material comprises randomly distributed fibers.

3. The gas permeable filter element of claim 2, wherein said fibers are packed to a density of about 76 pounds per 3000 square feet.

4. The gas permeable filter element of claim 3, wherein said fibers comprise materials selected from the group consisting essentially of cellulose fibers.

5. The gas permeable filter element of claim 4, wherein said fibers are formed into a mat having an average thickness of about 0.028 inches.

6. A filter element, comprising:

a gas permeable substantially cylindrical inner filter element;

a gas permeable substantially cylindrical outer filter element radially spaced and concentric with said inner filter element, said inner and outer filter elements defining an annulus having an inlet end and an outlet end coextensive with respective inner and outer filter element inlet and outlet ends;

a gas impervious baffle disposed adjacent the inlet end of the annulus for forcing the particulate laden gas stream into the annulus; and a gas permeable end filter element attached in contact with and closing the inner and outer filter element outlet ends and extending coextensively across and closing said annulus outlet end, whereby the particulate laden gas stream passes through either said inner filter element, said outer filter element, or said end filter element.

7. A filter assembly for removing particulates from a particulate laden gas stream, said filter assembly comprising:

a filter housing having a particulate laden gas stream inlet and a substantially particulate-free gas stream outlet, the particulate laden gas stream inlet including an inlet plate having a plurality of slots therethrough;

a gas permeable frustro-conical inner filter support having an inner surface, an outer surface, a large diameter end, and a small diameter end, the large diameter end being mounted to the inlet plate of said filter housing;

a gas permeable frustro-conical outer filter support having an inner surface, an outer surface, a large diameter end, and a small diameter end, the small diameter end being mounted to the inlet plate of said housing so that said outer filter support is radially spaced and concentric with said inner filter support;

an annular filter mounted between and supported by said inner and outer filter supports, said annular filter including a substantially cylindrical inner filter element joined to a substantially cylindrical outer filter element by an end filter element, said inner filter element being positioned on the outer surface of said inner filter support and said outer filter element being positioned on the inner surface of said outer filter support so that the inner and outer filter elements define an annulus having an inlet end and a gas permeable outlet end, the frustro-conical shapes of said inner and outer supports having means for securing said annular filter element within said housing, and whereby the particulate laden gas stream passing through the slots in the inlet plate is directed into the annulus and passes through either the inner filter element and inner filter support, the outer filter element and outer filter support, or the end filter element.

8. The particulate filter assembly of claim 7, including a gas impervious resilient end seal attached to the inlet end of the annulus, said end seal including a plurality of flaps and wherein the slots in the inlet plate include turned out edges to engage the flaps in said end seal and open the flaps when said annular filter element is urged against the inlet plate.

9. A filter for removing particles from a particulate laden gas stream, comprising:

a gas permeable filter element including a substantially cylindrical inner filter element joined to a substantially cylindrical outer filter element by an end filter element, said outer filter element being radially spaced and concentric with said inner filter element so that the inner and outer filter elements define an annulus having an inlet end and a gas permeable outlet end coextensive with respective inner and outer filter element inlet and outlet ends, said end filter element attached in contact with and closing the inner and outer filter element outlet ends and extending coextensively across and closing said annulus outlet end; and a gas impervious baffle mounted to the inlet end of the annulus for forcing the particulate laden gas stream into the annulus, whereby the particulate laden gas stream passes through either the inner filter element, the outer filter element, or the end filter element.

* * * * *